(12) United States Patent  (10) Patent No.: US 7,739,378 B2
Petite  (45) Date of Patent: *Jun. 15, 2010

(54) SYSTEM AND METHOD FOR TRANSMITTING POLLUTION INFORMATION OVER AN INTEGRATED WIRELESS NETWORK

(75) Inventor: Thomas David Petite, Douglasville, GA (US)

(73) Assignee: Sipco, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/206,106

(22) Filed: Sep. 8, 2008

(65) Prior Publication Data

US 2009/0006617 A1  Jan. 1, 2009

Related U.S. Application Data

(63) Continuation of application No. 10/021,100, filed on Oct. 30, 2001, now Pat. No. 7,424,527.

(51) Int. Cl.
*G06F 15/173* (2006.01)

(52) U.S. Cl. .............. 709/224; 340/853.3; 340/853.8; 340/839.2; 370/230

(58) Field of Classification Search .............. 340/853.2, 340/853.3, 853.8; 709/224; 370/230
See application file for complete search history.

(56) References Cited

U.S. PATENT DOCUMENTS

| 4,446,458 A | 5/1984 | Cook |
| 4,692,761 A | 9/1987 | Robinton |
| 5,251,205 A | 10/1993 | Callon et al. |
| 5,319,698 A | 6/1994 | Glidewell et al. |
| 5,383,134 A | 1/1995 | Wrzesinski |
| 5,390,206 A | 2/1995 | Rein |
| 5,438,329 A | 8/1995 | Gastouniotis et al. |
| 5,440,545 A | 8/1995 | Buchholz et al. |
| 5,445,347 A | 8/1995 | Ng |
| 5,481,532 A * | 1/1996 | Hassan et al. ............... 370/312 |
| 5,502,726 A | 3/1996 | Fischer |
| 5,515,419 A | 5/1996 | Sheffer |
| 5,553,094 A | 9/1996 | Johnson |

(Continued)

FOREIGN PATENT DOCUMENTS

WO  WO98/10393 A1  3/1998

(Continued)

OTHER PUBLICATIONS

Babak Daneshrad, et al.; 1997 Project Summary "Mobile Versatile Radios (MoVeR);" University of California, Los Angeles; pp. 1-4.

(Continued)

*Primary Examiner*—Duyen Doan
(74) *Attorney, Agent, or Firm*—Troutman Sanders LLP; Ryan A Schneider; James Hunt Yancey, Jr.

(57) ABSTRACT

A pollution information message system provides a system and method for generating and transmitting pollution information messages. In one embodiment, the pollution information message system employs a transceiver network with a plurality transceivers coupled to monitoring devices. Control room operators receive a pollution information message from an identifiable transceiver. The transceiver, identified by an identification code, indicates a location and the nature of the detected pollution.

14 Claims, 5 Drawing Sheets

U.S. PATENT DOCUMENTS

| | | | |
|---|---|---|---|
| 5,640,002 A | 6/1997 | Ruppert et al. | |
| 5,655,219 A | 8/1997 | Jusa et al. | |
| 5,673,252 A | 9/1997 | Johnson et al. | |
| 5,702,059 A | 12/1997 | Chu et al. | |
| 5,726,984 A | 3/1998 | Kubler et al. | |
| 5,884,271 A | 3/1999 | Pitroda | |
| 5,892,758 A | 4/1999 | Argyroudis | |
| 5,907,491 A | 5/1999 | Canada | |
| 5,917,629 A | 6/1999 | Hortensius et al. | |
| 5,963,650 A | 10/1999 | Simionescu | |
| 5,987,421 A | 11/1999 | Chuang | |
| 6,026,095 A | 2/2000 | Sherer et al. | |
| 6,044,062 A | 3/2000 | Brownrigg et al. | |
| 6,060,994 A | 5/2000 | Chen | |
| 6,064,318 A | 5/2000 | Kirchner | |
| 6,073,169 A | 6/2000 | Shuey | |
| 6,078,251 A | 6/2000 | Landt et al. | |
| 6,115,580 A * | 9/2000 | Chuprun et al. | 455/1 |
| 6,157,464 A | 12/2000 | Bloomfield et al. | |
| 6,174,205 B1 | 1/2001 | Madsen et al. | |
| 6,175,922 B1 | 1/2001 | Wang | |
| 6,181,284 B1 | 1/2001 | Madsen et al. | |
| 6,188,354 B1 | 2/2001 | Soliman et al. | |
| 6,218,958 B1 | 4/2001 | Eichstaedt | |
| 6,246,677 B1 | 6/2001 | Nap | |
| 6,275,707 B1 | 8/2001 | Reed et al. | |
| 6,288,641 B1 | 9/2001 | Casais | |
| 6,301,514 B1 | 10/2001 | Canada et al. | |
| 6,356,205 B1 * | 3/2002 | Salvo et al. | 340/853.3 |
| 6,366,217 B1 | 4/2002 | Cunningham | |
| 6,366,622 B1 | 4/2002 | Brown et al. | |
| 6,384,722 B1 | 5/2002 | Williams | |
| 6,396,839 B1 | 5/2002 | Ardalan | |
| 6,405,018 B1 | 6/2002 | Reudink et al. | |
| 6,542,076 B1 | 4/2003 | Joao | |
| 6,618,709 B1 | 9/2003 | Sneeringer | |
| 6,654,357 B1 | 11/2003 | Wiedeman | |
| 6,735,630 B1 | 5/2004 | Gelvin et al. | |
| 6,816,088 B1 * | 11/2004 | Knoska et al. | 340/984 |
| 7,027,416 B1 | 4/2006 | Kriz | |
| 7,424,527 B2 | 9/2008 | Petite et al. | |
| 6,457,038 B1 | 9/2009 | Defosse | |
| 2002/0027504 A1 | 3/2002 | Davis et al. | |
| 2003/0023146 A1 | 1/2003 | Shusterman | |
| 2003/0035438 A1 | 2/2003 | Larrson | |
| 2003/0073406 A1 | 4/2003 | Benjamin et al. | |
| 2005/0195768 A1 | 3/2005 | Petite | |
| 2005/0195775 A1 | 8/2005 | Petite | |
| 2005/0201397 A1 | 9/2005 | Petite | |
| 2008/0186898 A1 | 7/2008 | Petite | |
| 2009/0006617 A1 | 1/2009 | Petite | |
| 2009/0068947 A1 | 3/2009 | Petite | |

FOREIGN PATENT DOCUMENTS

WO          WO00/36812 A1     6/2000

OTHER PUBLICATIONS

Rajeev Jain, et al.; 1997 Project Summary "Held Untethered Nodes;" University of California, Los Angeles; pp. 1-5.

Randy H. Katz and Eric A. Brewer; 1997 Project Summary "Towards a Wireless Overlay Internetworking Architecture;" University of California, Berkeley; pp. 1-8, including slide show presentation at http://daedalus.cs.berkeley.edu/talks/retreat.6.96/Overview.pdf.

J.J. Garcia-Luna-Aceves, et al.; "Wireless Internet Gateways (Wings);" IEEE, 1997; pp. 1271-1276.

Randy H. Katz, et al.; "The Bay Area Research Wireless Access Network (Barwan);" Electrical Engineering and Computer Science Department, University of California, Berkeley, CA; IEEE, 1996; pp. 15-20, including slide show presentation at http://daedalus.cs.berkeley.edu/talks/retreat.6.97/Barwan.S97.ppt.

USPTO's Decision dated Nov. 28, 2008 Denying Ex Parte Reexamination of USPN 7,103,511 in Reexamination Control No. 90/010,315.

USPTO's Decision dated Jun. 22, 2009 Granting Ex Parte Reexamination of USPN 7,103,511 in Reexamination Control No. 90/010,509.

USPTO's Decision dated Jun. 22, 2009 Granting Ex Parte Reexamination of USPN 7,103,511 in Reexamination Control No. 90/010,505.

USPTO's Decision dated Jun. 22, 2009 Granting Ex Parte Reexamination of USPN 7,103,511 in Reexamination Control No. 90/010,507.

USPTO's Decision dated Jun. 22, 2009 Granting Ex Parte Reexamination of USPN 7,103,511 in Reexamination Control No. 90/010,508.

USPTO's Decision dated Jul. 21, 2009 Granting Ex Parte Reexamination of USPN 6,891,838 in Reexamination Control No. 90/010,512.

USPTO's Decision dated Jul. 21, 2009 Granting Ex Parte Reexamination of USPN 6,891,838 in Reexamination Control No. 90/010,510.

USPTO's Decision dated Jul. 21, 2009 Granting Ex Parte Reexamination of USPN 6,891,838 in Reexamination Control No. 90/010,511.

USPTO's Decision dated Nov. 13, 2009 Granting Ex Parte Reexamination of USPN 6,891,838 in Reexamination Control No. 90/010,301.

K. Bult, et al.; "Lower Power Systems for Wireless Microsensors;" UCLA Electrical Engineering Department, Los Angeles, CA and Rockwell Science Center, Thousand Oaks, CA; pp. 25-29.

David B. Johnson and David A. Maltz, "Dynamic Source Routing in Ad Hoc Wireless Networks;" Computer Science Department, Carnegie Mellon University; A Chapter in Mobile Computing; Feb. 29, 1996; pp. 1-18.

David A. Maltz et al.; "Experiences Designing and Building a Multi-Hop Wireless Ad Hoc Network Testbed;" School of Computer Science, Carnegie Mellon University; Mar. 5, 1999; pp. 1-20.

"Part 11: Wireless LAN Medium Access Control (MAC) and Physical Layer (PHY) Specifications" IEEE Std 802. Nov. 1997; published Jun. 26, 1997 by the IEE; pp. 1-459.

John Jubin and Janet D. Tornow; "The DARPA Packet Radio Network Protocols;" Proceedings of the IEEE; vol. 75, No. 1, Jan. 1987; pp. 64-79.

Chane Lee Fullmer; "Collision Avoidance Techniques for Packet-Radio Networks" thesis; University of California at Santa Cruz, CA; Jun. 1998; pp. 1-172.

* cited by examiner

SYSTEM AND METHOD FOR TRANSMITTING POLLUTION INFORMATION OVER AN INTEGRATED WIRELESS NETWORK

CROSS REFERENCE TO RELATED APPLICATION

This application is a continuation of U.S. Ser. No. 10/021,100, filed 30 Oct. 2001 (to be issued on 9 Sep. 2008 as U.S. Pat. No. 7,424,527), the entire contents and substance of which are hereby incorporated by reference.

BACKGROUND OF THE INVENTION

1. Field of the Invention

The present invention generally relates to communicating pollution information and, in particular, to a system and method for generating and transmitting pollution information through an integrated wireless communication network.

2. Related Art

Regulation of allowable pollution discharges into the environment from pollution sources are governed by federal, state and/or local laws. Generally, the least strict pollution criteria are defined by federal law. Federal agencies typically enforce various federal pollution laws by requiring timely reporting of pollution discharges and violations of criteria, by requiring clean-up of the pollution discharges, and by requiring termination of the discharges from the pollution sources. Furthermore, state laws, local laws and/or company policies may set stricter criteria at specific locations. Such pollution criteria define limits of pollution sources that may be, or are, polluting air, water and/or soil. Pollution discharges can include materials, chemicals, or even noise.

Detectors are used to detect the presence of pollution. Such detectors, placed in suitable locations, provide information that may be used to detect a violation of an applicable pollution criteria and provide data to ascertain the extent of the discharge. Or, detectors may be used to demonstrate compliance with applicable pollution criteria (in that failure to detect pollution discharges implies that the pollution source is operating in compliance with applicable pollution discharge regulations).

A threshold is defined in a pollution detector such that when pollution is detected at a level at least equal to the threshold, the pollution detector generates a signal and/or data indicating that pollution levels are exceeding the threshold. Data may include, but is not limited to, the level of pollution, times of detection and/or type of pollution detected.

However, such pollution detectors are often monitored on a periodic basis. Thus, data provided by such pollution detectors would indicate a pollution discharge after the initial discharge event. If the discharge is ongoing, serious pollution criteria violations may occur. If the discharge is ongoing and not reported in a timely manner, even from a low rate discharge that would not otherwise cause a criteria violation had the discharge been detected and remedied in a timely manner, very serious pollution violations may result. Regulatory agencies may impose expensive fines, require expensive clean-up measures, may require monitoring and/or may shut down the polluting facility.

Pollution detectors may be located in difficult to access locations. For example, pollution detectors configured to monitor water conditions may be submerged. Or, pollution detectors configured to monitor ground water conditions may be located deep inside a well. Or, pollution detectors configured to monitor air pollution may be located on high structures or seasonally inaccessible locations such as mountain tops. Or, pollution detectors configured to monitor air pollution may be placed on mobile equipment such as large earth movers at an ore mine. Such difficult to access pollution detectors may result in the untimely reporting of discharges and/or may result in increased monitoring expenses.

Also, if the data from the pollution detectors are manually collected, the data collection process may be labor intensive and expensive. Furthermore, data entry may also be time consuming and expensive. Accordingly, many hours of data collection and entry time may be required for even a relatively simple pollution detection system.

Thus, a heretofore unaddressed need exists in the industry for providing a pollution information communication system that more timely indicates the nature, location and/or other pertinent information associated with a pollution discharge. Also, there is a heretofore unaddressed need to provide a less expensive to monitor and a more conveniently accessed pollution information communication system.

SUMMARY OF THE INVENTION

The present invention overcomes the inadequacies and deficiencies of the prior art as discussed hereinabove. One embodiment of the present invention, a pollution message communication system, provides a system and method for communicating pollution information messages corresponding to detected pollution discharges and/or the presence of pollution by pollution detectors. The pollution message communication system employs a transceiver network with a plurality transceivers residing in a network. A plurality of transceivers are coupled to one of a plurality of pollution detectors each located at one of a plurality of locations. The transceivers each have unique identification codes. In one embodiment, transceivers broadcast and receive radio frequency (RF) signals. A site controller provides communications between the plurality of transceiver units and a pollution monitoring management controller residing in a pollution message system control center.

One embodiment of the present invention can also be viewed as providing a method for communicating pollution information messages. In this regard, the method can be broadly summarized by the following steps. Generating a pollution information message with a transceiver having at least an identification code uniquely assigned to the transceiver, and communicating the pollution information message from the transceiver to a network transceiver such that the pollution information message is communicated over an intermediate communication system to a pollution monitoring management controller.

Another embodiment of the present invention can be broadly summarized by the following steps. Receiving a pollution information message broadcasted from a transceiver having at least an identification code uniquely assigned to the transceiver, determining information relevant to the received pollution information message by associating the information with the identification code of the transceiver, and communicating the pollution information message and the relevant information, such as to a person.

Other features and advantages of the present invention will become apparent to one skilled in the art upon examination of the following detailed description, when read in conjunction with the accompanying drawings. It is intended that all such features and advantages be included herein within the scope of the present invention and protected by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION a. Overview of the Pollution Information Message System

In general, the present invention relates to a system and method for communicating pollution information messages that are transmitted from a transceiver, through a transceiver network, to a pollution monitoring management controller so that a discharge of pollution and/or the presence of pollution is detected and reported in a timely manner, as described in greater detail below. The pollution information message, in one embodiment, is generated in response to a detector that detects the presence of pollution.

Figure 1:
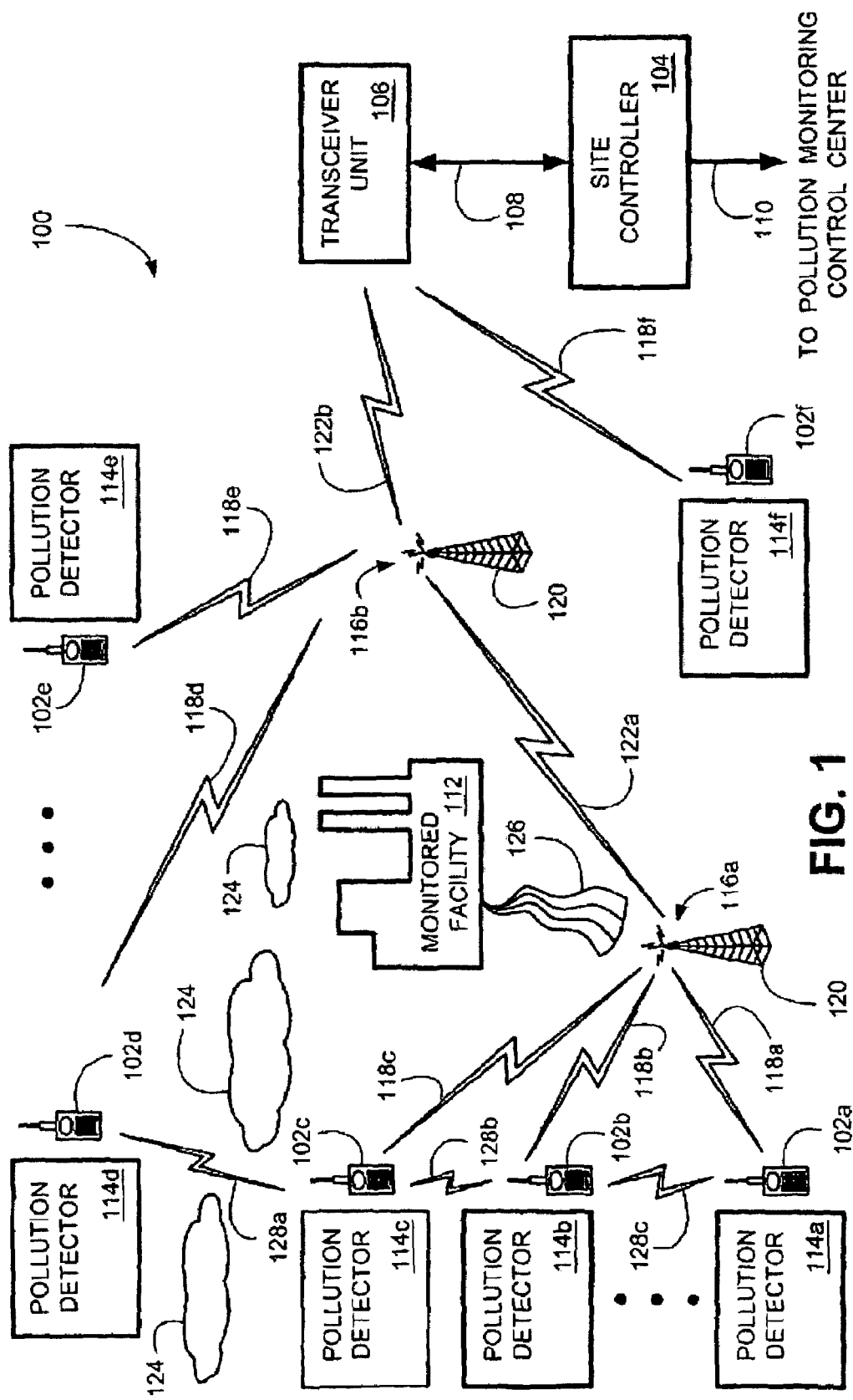
FIG. 1 is a block diagram illustrating a portion of a plurality of transceivers residing in a transceiver network configured to communicate pollution information.

FIG. 1 is a block diagram illustrating a portion of a transceiver network 100 having a plurality transceivers 102a-102f. Preferably, in one embodiment, transceivers 102a-102f are configured to selectively broadcast and/or receive pollution information messages using radio frequency (RF) signals. A site controller 104 provides communications between a transceiver unit 106, via connection 108, and a pollution monitoring management controller 302 residing in a pollution monitoring control center 300 (FIG. 3), via connection 110.

Figure 2:
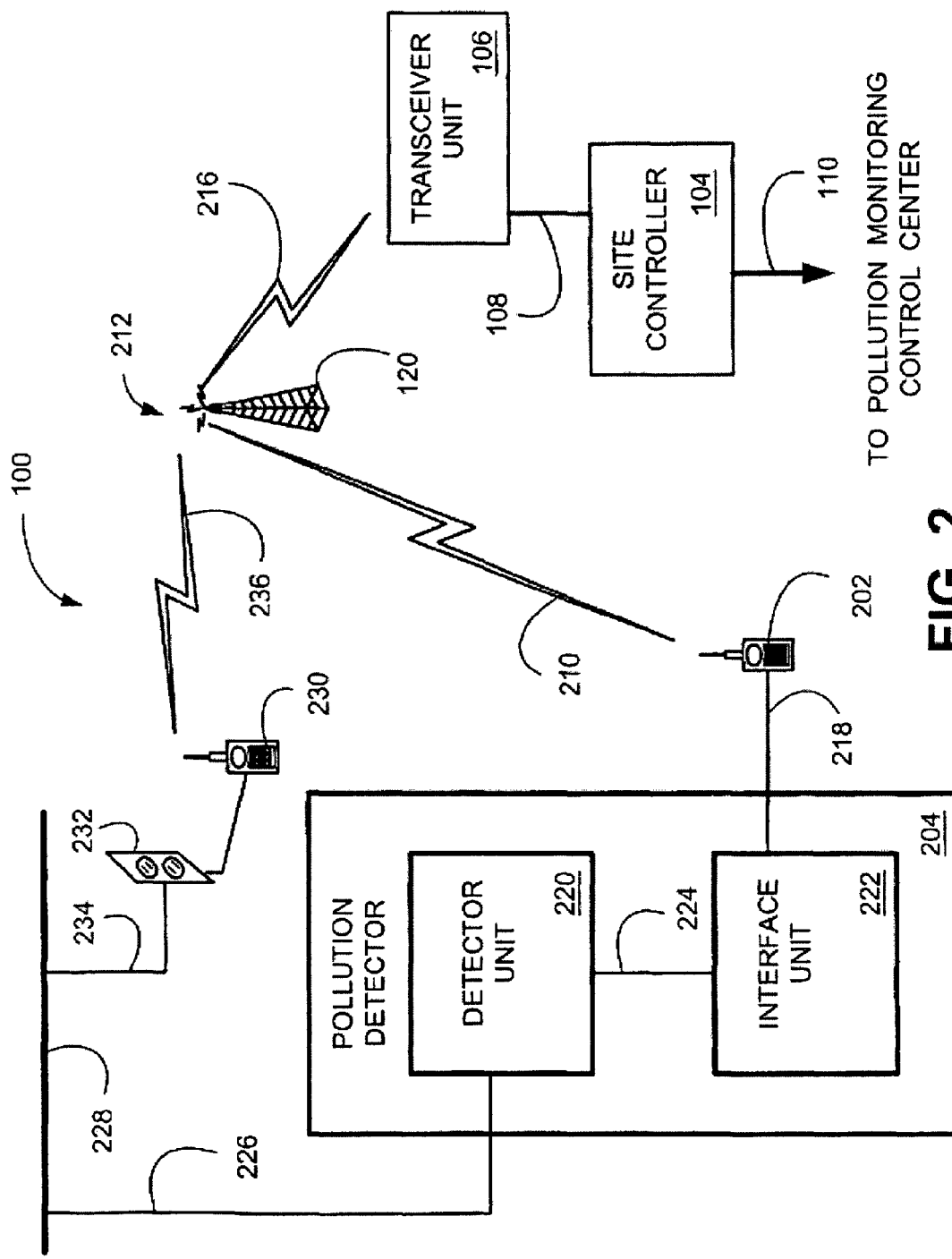
FIG. 2 is a block diagram illustrating an embodiment of a transceiver of FIG. 1 coupled to a pollution detection device.

FIG. 2 is a block diagram illustrating one embodiment of a pollution information communication system with a transceiver 202 coupled to a pollution detector 204. In one embodiment, if a pollution level exceeding a predefined threshold is detected, the pollution detector 204 generates a signal having pollution information, described in greater detail below, that is communicated to the transceiver 202. That is, when the presence of pollution is detected, thereby indicating a pollution discharge, the pollution detector begins communication with the transceiver 202.

In another embodiment, the pollution detector 204 is in continues communication with the transceiver 202 so that pollution information is provided on a real-time basis. Here, if no pollution is detected, or pollution levels are detected below a threshold, the information may demonstrate compliance with applicable pollution discharge regulations.

In one embodiment, in response to receiving a signal and/or data from the pollution detector 204, the transceiver 202 transmits a pollution information message via an RF signal 210 that is detected by transmitter station 212. Transmitter station 212, located on a suitable high point, such as a tower 120 (see also FIG. 1) or the like, transmits an RF signal 216 to the transceiver unit 106. The transceiver unit 106 communicates the pollution information message to the site controller 104. Eventually, the pollution information message is received by the pollution monitoring control center 300 (FIG. 3), in a manner described in greater detail below.

Figure 3:
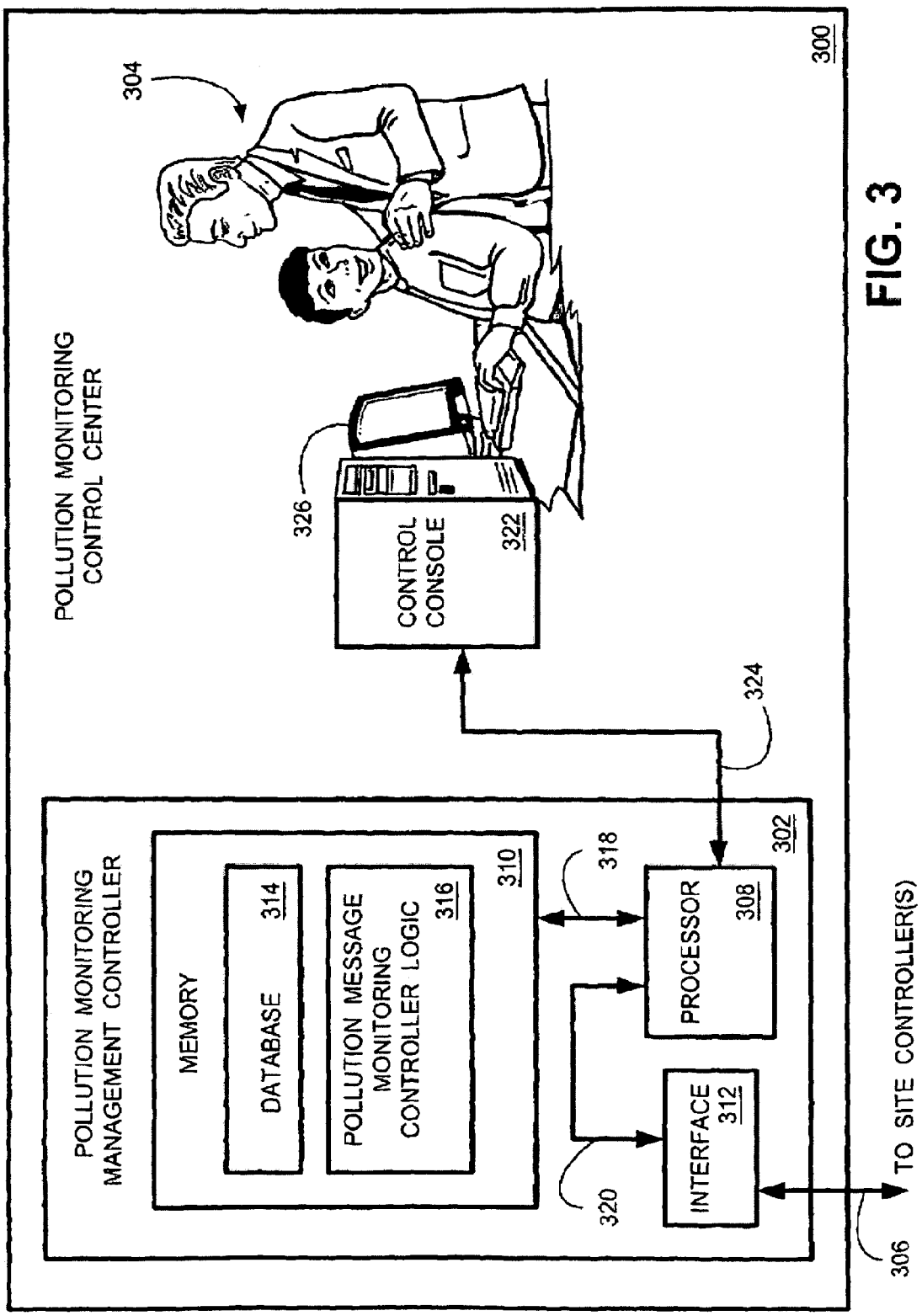
FIG. 3 is a block diagram illustrating selected components of an embodiment of a pollution monitoring control center in communication with the transceiver network of FIG. 1.

FIG. 3 is a block diagram illustrating selected components of a pollution monitoring control center 300 in communication with the transceiver network 100 (FIG. 1). The received pollution information messages are received by a pollution monitoring management controller 302, described in greater detail below. In one embodiment, the control room operators 304 receive a processed pollution information message from the pollution monitoring management controller 302 and initiate appropriate actions in response to the received pollution information message. In another embodiment, the pollution information is communicated to an automatic system.

b. Pollution Information Message Transceiver System Environment

FIG. 1 is a block diagram illustrating a portion of a transceiver network 100 in communication with a plurality of transceivers 102a-102f residing in proximity to a monitored facility 112. At least one transceiver is coupled to each one of the pollution detectors 114a-114f, as will be described in greater detail below.

For convenience of illustration, and for convenience of explaining the operation and functionality of the pollution information message system, only a single monitored facility 112 is illustrated on FIG. 1. A monitored facility 112 may be a factory, a business or other location where a plurality of pollution detectors 114a-114f are located. Furthermore, the term "monitored facility" as used herein may also be any location where pollution detectors are located to detect the presence of pollution. For example, but not limited to, the pollution detectors may be located in proximity to a lake, reservoir, mountain, canyon or other location of interest.

A pollution information message system is configured to receive pollution information messages, in a manner described below, from hundreds, even thousands, of transceivers, depending upon the particular architecture in which the pollution information message system is implemented. Therefore, the explanation of the operation and functionality of the pollution information message system described below is limited to a small segment of the transceiver network 100 for convenience.

A pollution information message transmitted from any one of the transceivers 102a-102f is relayed to the pollution monitoring management controller 302 (FIG. 3) via one or more of the transceiver stations 116a and 116b. Preferably, in one embodiment, the transceivers broadcast the pollution information message using a suitable radio frequency (RF) signal. The pollution information message includes at least the identification code of the transceiver generating the pollution information message.

For example, transceivers 102a, 102b and 102c are illustrated as transmitting pollution information messages to transceiver station 116a via RF signals 118a, 118b and 118c, respectively. Similarly, transceivers 102d and 102e broadcast pollution information messages to transceiver station 116b via RF signals 118d and 118e, respectively. Thus, pollution detectors 114c and/or 114d may detect a presence of air pollution emissions 124 from the monitored facility 112. Accordingly, transceivers 102c and 102d, respectively, would then communicate pollution information messages to their respective receiving transceiver stations 116a and 116b.

A transceiver (not shown) in transceiver station 116a is illustrated as communicating a pollution information message to transceiver station 116b via signal 122a. The transceivers 102a-102e, and/or transceivers residing in the transceiver stations, may be identical to each other or may be configured to have different characteristics, such as different bandwidths, frequencies and/or signal broadcast strengths.

Each of the transceiver stations 116a and 116b detect broadcasted pollution information messages from a broadcasting transceiver 102a-102e, depending upon the strength of the broadcasted pollution information message and the distance of the transceiver stations 116a and 116b from the broadcasting transceiver. That is, a transceiver stations 116a and 116b detect broadcasted pollution information messages from any transceivers and/or any transceiver stations in its reception range. Preferably, transceiver stations 116a and 116b reside at a suitably elevated location, such as on a tower 120, high building, mountain top or the like to facilitate reception and transmission of pollution information messages. Pollution information messages from the transceivers 102a-102e are relayed by the transceiver stations 116a and 116b to the transceiver unit 106 via RF signals 122a-122b. Each transceiver station has a transceiver (network transceiver) configured to communicate pollution information messages with the transceivers 102a-102e, transceiver stations, and/or at least one transceiver unit 106.

In one embodiment, transceivers are configured to communicate directly with transceiver unit 106, assuming the broadcasting transceivers are within broadcasting range of the transceiver unit 106. For example, pollution detector 114f may detect a fluid discharge 126 from the monitored facility 122. Accordingly, transceiver 102f would broadcast a pollution information message, via signal 118f, directly to the transceiver unit 106.

The transceivers residing in the transceiver station may be the same as one of the transceivers 102a-102f, or be configured to have different characteristics such as different bandwidths, frequencies and/or signal broadcast strengths. In some applications, a unique identification code associated with the broadcasting transceiver station is added to the pollution information message.

For example, a pollution information message detected by the transceiver station 116a is relayed to the transceiver station 116b via RF signal 122a. The pollution information message is then relayed by the transceiver station 116b to the transceiver unit 106 via RF signal 122b. Similarly, a pollution information message detected by the transceiver station 116b is relayed to the transceiver unit 106 via RF signal 122b.

One embodiment of the pollution information message system employs transceivers that use standardized digital communication formats such that the information is communicated as packetized units of digital data. Other embodiments employ other suitable communication formats. Other suitable communication formats may be either digital or analog signals.

The transceiver unit 106 converts received pollution information messages into a suitable communication signal formatted for communication over a hardwire connection 108. In one embodiment, the transceiver unit 106 formats the received broadcasted RF pollution information messages into a standardized RS 232 signal. Another embodiment converts the received pollution information messages into a standardized RS 485 signal. The transceiver unit 106 may be configured to convert the received pollution information messages from the transceivers 102a-102f and/or transceiver stations 116a and 116b of the transceiver network 100 into any suitable signal for transmission over a hardwire interconnection, such as, but not limited to, a metallic conductor, a coaxial cable, an optical fiber cable or the like. In some applications, a unique identification code associated with the transceiver unit 106 is added to the pollution information message.

When transceivers (not shown) at other monitored facilities (not shown) are integrated into the transceiver network 100, a large network of transceivers will be able to communicate pollution information messages to the pollution monitoring management controller 302. For convenience of illustration, only one monitored facility 112 is illustrated in FIG. 1. Many other monitored facilities and/or locations may be incorporated into the transceiver network 100 such that all of the transceivers are communicating to the pollution monitoring management controller 302 via the transceiver network 100.

A portion of the transceiver network 100 illustrated in FIG. 1 is configured according to the strength of the broadcasted RF signals 118a-118f from the plurality of transceivers 102a-102f, and the strength of the broadcasted signals 122a and 122b from the plurality of transceiver stations 116a and 116b. Thus, many more transceiver units coupled to pollution monitors may be located out in a monitored area. Additional transceiver stations are deployed as necessary.

Site controller 104 is configured to communicate with any desired number of transceiver units. Furthermore, a plurality of site controllers can be deployed within a monitored area, thereby increasing the area of coverage of the transceiver network 100. There are no known limitations that would limit the number of transceivers in communication with the pollution monitoring control center 300 (FIG. 3) when a suitable number of transceiver units and site controllers are implemented with a plurality of transceivers to form a transceiver network 100.

Site controller 104, in another embodiment, is configured to include other functionalities. Such functionalities may be implemented in a site controller without departing substantially from the operation and functionality of the invention. For example, a site controller 104 may be configured to transmit acknowledgment signals back to the transceiver initiating the pollution information message or another designated transceiver. Such an embodiment is particularly advantageous in indicating that a pollution information message has been received from a location of interest. In some applications, a unique identification code associated with the site controller 104 is added to the pollution information message.

Furthermore, for convenience of illustration, the site controller 104 and the transceiver unit 106 are illustrated as separate components coupled together via connection 108. In another embodiment, the transceiver unit 106 and the site controller 104 are incorporated into a single unit that performs substantially the same functionality of the transceiver unit 106 and the site controller 104. Alternatively, the transceiver unit 106 and site controller 104 may be conveniently included in the same housing. Such an alternative embodiment is particularly advantageous when it is desirable to centrally locate components to provide easy access and/or when it is desirable to enclose the devices in a single environmentally protective enclosure.

Each one of the transceivers, transceiver stations and transceiver units, have a unique identification code, such as a unique alpha-numeric identification code, a hexa-decimal code, or a like identification code. For example, transceiver 102b may have the unique identification code "102b". When a pollution information message is relayed by the transceiver 102b to the pollution monitoring management controller 302 (FIG. 3), the pollution information message is tagged or otherwise identified with the unique identity code "102b". Thus, the pollution monitoring management controller 302 knows where the transceiver 102b is located since location information for the transceiver 102b is retained in a database 314 (FIG. 3), described in greater detail below. To determine the location of the transceiver generating a pollution information message, the pollution monitoring management controller 302 need only associate the location information in the database 314 with the unique identification code of the transceiver since the pollution information message contains the identification code of the transceiver. Also, in one embodiment, the nature of the pollution information can be determined if the type of pollution monitor coupled to the transceiver 102b is described in the database 314.

Furthermore, the pollution monitoring management controller 302 may specifically poll the transceiver 102b to provide information by broadcasting a signal, using the unique identification code "102b", such that the transceiver 102b recognizes that it is instructed to broadcast the status information back to the pollution monitoring management controller 302. The pollution information message management controller 302, via site controller 104, instructs transceiver 106 to broadcast an information request signal to the transceiver 102b. Thus, transceiver unit 106 broadcasts an information request signal to transceiver station 116b. Transceiver station 116b broadcasts the information request signal to transceiver station 116a, which then broadcasts the information request signal to the transceiver 102b. Status information may include information of interest such as, but not limited to, the operational condition of the transceiver, the pollution detector, and/or their components. Furthermore, status information may include information regarding pollution detected by the pollution detector, such as but not limited to, current levels of detected pollution, type of detected pollution, nature of the detected pollution or other measured pollution related parameters. Such an embodiment is particularly advantageous in providing pollution information at desired intervals to, for example, but not limited to, form databases to perform scientific studies and/or to demonstrate compliance with relevant pollution regulations.

Similarly, the pollution monitoring management controller 302 is in communication with all of the individual transceivers of FIG. 1 such that a pollution information message is associated with specific transceivers. Furthermore, the pollution monitoring management controller 302 may request information from any desired transceiver integrated into the transceiver network 100.

For convenience of illustration, and for convenience of describing the operation and functionality of transceiver 202, the transceiver 202 is illustrated as coupled to a simplified pollution detector 204, via connection 218. Pollution detector 204 includes at least a detector unit 220 and interface unit 222. Detector unit 220 is configured to detect the presence of pollution. Such a detector unit 220, in one embodiment, is configured to detect particular types of pollution and/or to detect the level, quantity, magnitude or the like of the pollution.

For example, such a pollution detector unit 220 may be configured to detect nitrogen oxide (NOX) pollution in the air from a nearby power plant. Another embodiment of the detector unit 220 is configured to generate signals indicating detection of the specified pollutants when the level of the pollutant exceeds a predefined threshold. Other known pollution detectors known in the art of detecting pollution may be similarly coupled to a transceiver for integration into a pollution information message system. Detailed operations of these pollution detectors, and the associated components residing in the pollution detectors, are not described in detail herein other than to the extent necessary to understand the operation and functioning of these detectors when employed as part of a pollution information message system. Accordingly, any such pollution detector, when integrated into a pollution information message system, is intended to be disclosed herein and to be protected by the accompanying claims.

Pollution detector 204 includes an interface unit 222 coupled to the detector unit 220, via connection 224, and coupled to transceiver 202, via connection 218. Interface unit 222 receives pollution information from the detector unit 220 and processes the received information into a signal suitable for the transceiver 202. Thus, the detector unit 220 detects the presence of pollutants and the interface unit 222 configures the information from the detector unit 220 into a signal suitable for the transceiver 202. Then, the pollution information message is generated and transmitted by the transceiver 202. The interface unit 222 may be implemented using any suitable known interface device configured to receive information from a pollution detector and configured to generate a signal suitable for a transceiver employed in a pollution information message system. Other embodiments of the interface unit 222 may be specially fabricated and specially designed interface units manufactured specifically for integration into a pollution information message system. Detailed operation of the interface unit 222, and the associated components residing in the interface unit 222, is not described in detail herein other than to the extent necessary to understand the operation and functioning of the interface unit 222 and its components when employed as part of a pollution information message system. Accordingly, any such interface unit 222 is intended to be disclosed herein and to be protected by the accompanying claims.

c. Integrating the Pollution Information Message Transceiver System into a Pollution Information Message System Control Center FIG. 3 is a block diagram illustrating selected components of one embodiment of a pollution monitoring control center 300 in communication with the transceiver network 100. Included as an integral component of the pollution information message system is the pollution monitoring management controller 302. The pollution monitoring management controller 302 is coupled to at least one of the previously described site controllers 104 via connection 306. Connection 306 is coupled to connection 110 (FIGS. 1 and 2) through an intermediary communication system, described in greater detail below.

The pollution monitoring management controller 302 includes at least a processor 308, a memory 310 and an interface 312. Memory 310 includes at least a database 314 and the pollution message monitoring controller logic 316. Processor 308 is coupled to the memory 310 via connection 318 and is coupled to the interface 312 via connection 320.

When one of the plurality of transceivers residing in the transceiver network 100 transmits a pollution information message, the pollution monitoring management controller 302 receives the pollution information message and stores the received pollution information message into database 314 or in another suitable location in a memory. Processor 308 executes the pollution message monitoring controller logic 316 to appropriately store the received pollution information message into the database 314 or in another suitable location in a memory. In one embodiment, database 314 employs a look-up table.

The database 314 includes information of interest such as, but not limited to, the identification code of each the transceivers, the location of the transceiver, and the nature of the pollution information message. The nature of the pollution information message in some applications is determined by the type of pollution detection to which the transceiver is coupled to. For example, if the transceiver is coupled to a pollution detector configured to detect chemical "abc," the database 314 would include information indicating that a pollution detector is coupled to the transceiver such that a pollution information message received from that transceiver would indicate the possible presence of a chemical "abc" detected by the pollution detector.

Other information of interest may also be included in the database 314. For example, but not limited to, information identifying the specific customer, customer's address and/or attributes of the customer's facility may be included within database 314. Also, individuals that should be contacted when a pollution information message is received may also be included in the database 314. The nature of the pollution detector that is monitored by the transceiver may also be included within the database 314. Such information pertaining to the nature of the detector includes, but is not limited to, make, model, manufacturer, manufacture date and/or components. Accordingly, any type of information of interest may be included within the database 314. Furthermore, information regarding attributes of the transceivers, the transceiver stations, the transceiver units and the site controllers, such as, but not limited to, make, model, manufacturer, manufacture date, components, identification codes and/or locations, may be included in database 314.

The pollution monitoring management controller 302 is illustrated as being coupled to the control console 322, via connection 324. Typically, the control room operators 304 interface with the various components residing in the pollution monitoring control center 300 via one or more control consoles 322. Information is displayed on a suitable interface device, such as a display screen 326. Thus, a control room operator 304, after determining a valid pollution information message is received, may take appropriate actions.

Figure 4:
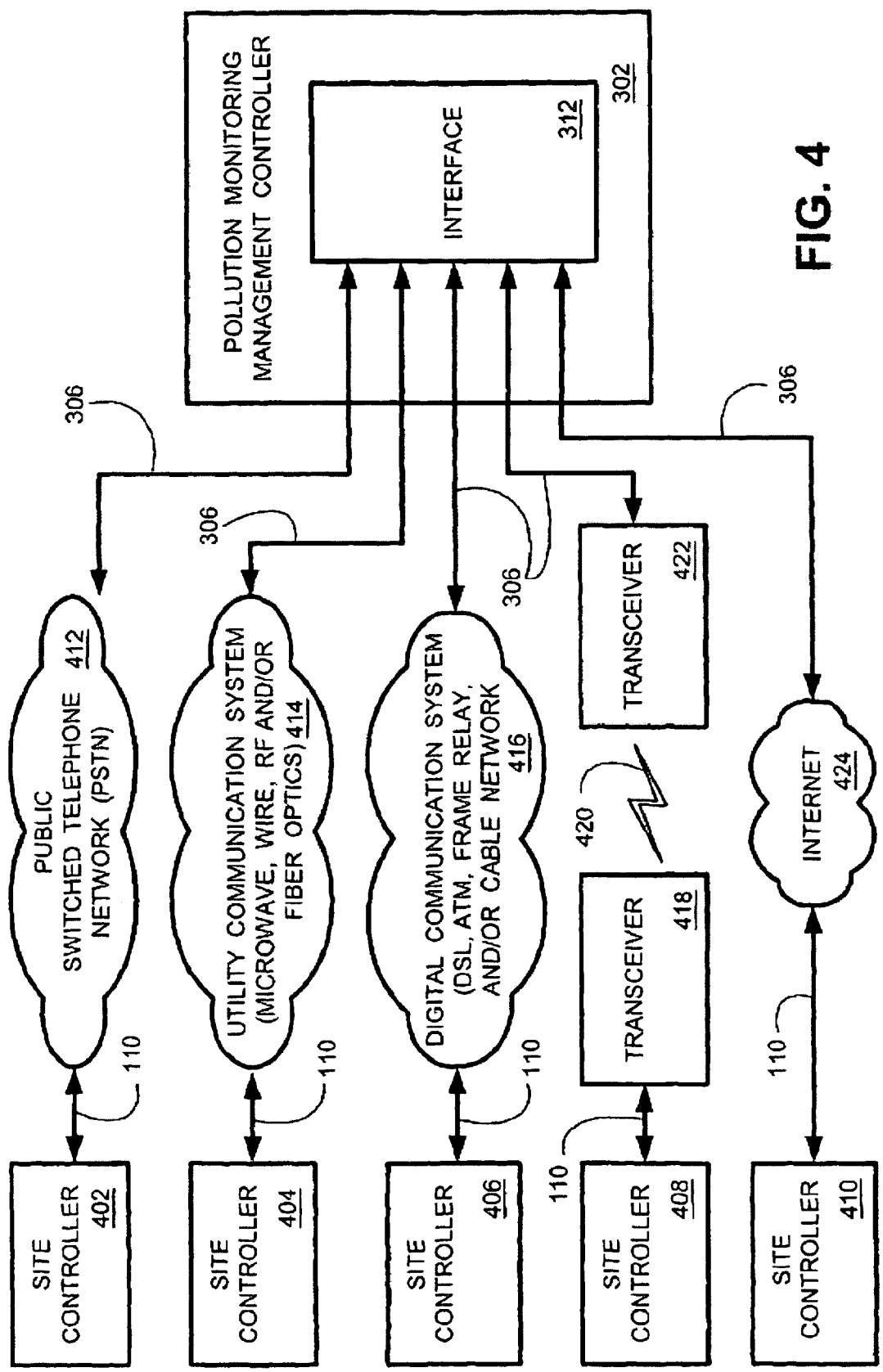
FIG. 4 is a block diagram illustrating alternative intermediate communication systems employed by the pollution information communication system of FIGS. 1-3.

In another embodiment, the pollution monitoring management controller 302 is coupled to an automatic system, such as but not limited to, a system control and data acquisition (SCADA) system. Such an embodiment is advantageous in automatically monitoring and controlling a facility. For example, but not limited to, pollution may be monitored such that a value or gate in a piping system is operated upon detection of pollution.

d. Communication Between Site Controllers and the Pollution Monitoring Management Controller As described above with reference to FIGS. 1-3, a site controller 104 (FIGS. 1 and 2) is in communication with the interface 312 residing in the pollution monitoring management controller 302 (FIGS. 3 and 4). FIG. 4 is a block diagram illustrating alternative intermediate communication systems employed by the pollution information message system. Five exemplary site controllers 402, 404, 406, 408 and 410 are illustrated as being coupled to the interface 312 residing in the pollution monitoring management controller 302, via five communication systems. These exemplary intermediate communication systems are intended to illustrate some, but not all, of the possible communication systems through which the connections 110 (FIGS. 1-2) and 306 (FIG. 3) may coupled to such that the pollution information message system enables communication between the site controllers and the pollution monitoring management controller 302.

Site controller 402 is communicating to interface 312 via a public switched telephone network (PSTN) 412, via connections 110 and 306. Thus, site controller 402 is configured to provide a suitable signal having pollution information that is provided to the PSTN 412. PSTN 412 receives the suitably configured pollution information from the site controller 402 and relays the information to the interface 312. Interface 312 converts the received pollution information from the PSTN 412 and reformats the pollution information into a suitable communication signal that is provided to processor 308 (FIG. 3) such that the pollution information is stored in the database 314 (FIG. 3) in a manner described above.

In one embodiment, when the pollution monitoring management controller 302 issues an acknowledgment signal, the interface 312 converts the acknowledgment signal into a suitable signal formatted for communication over the PSTN 412. The suitably formatted acknowledgment signal is then communicated through the PSTN 412 and is transmitted to the site controller 402 via connections 306 and 110. The site controller 402 then converts the received acknowledgment signal from the PSTN 412 into a suitably formatted signal for transmission out to the selected transceiver(s) as described above.

The components (not shown) residing in the interface 312 and the site controller 402 that are configured to transmit, receive and convert signals from the PSTN 412 are known in the art and, therefore, are not described in detail herein other than to the extent necessary to understand the operation and functioning of these components when employed as part of the interface 312 and the site controller 402. Such known components are too numerous to describe in detail herein, and that any configuration of such known components having the above-described functionality may be implemented in the interface 312 and the site controller 402 without departing substantially from the pollution information message system. Any such implementation of components configured to receive and convert communication signals from PSTN 412 are intended to be within the scope of this disclosure and to be protected by the accompanying claims.

Site controller 404 is communicating to interface 312 via a legacy utility communication system 414, via connections 110 and 306. Thus, site controller 404 is configured to provide a suitable signal having pollution information that is provided to the legacy utility communication system 414. The legacy utility communication system 414 is a known communication system employed by the electric utility or other responsible organization for the monitoring and/or control of an electric energy distribution system or transmission system.

The legacy utility communication system 414 is an integrated network of communication technologies that may include, but is not limited to, microwave communication systems, wire based communication systems, RF communications or fiber optics networks. Furthermore, these various communication systems are integrated into a composite communication system. Thus site controller 404 is configured to interface at convenient location on the legacy utility communication system 414 such that the site controller 404 provides the appropriately formatted information to the legacy utility communication system.

For example, site controller 404 may integrate into an existing fiber optics portion of the legacy utility communication system 414. In one embodiment, site controller 404 is configured to interface with a suitably configured fiber optics connector to provide interconnectivity directly to the fiber optics networks, or alternatively, is configured to communicate with various communication components that are associated with the communication of optical signals over the fiber optics network. Another embodiment of site controller 404 is configured to communicate with the microwave portions, the wire portions, or the RF portions of the legacy utility communication system 414.

The legacy utility communication system 414 receives the suitably configured pollution information from the site controller 410 and relays the information to the interface 312. Interface 312 converts the received pollution information from the legacy utility communication system 414 and reformats the pollution information into a suitable communication signal that is provided to processor 308 (FIG. 3) such that the pollution information is stored in the data base 314 (FIG. 3) in a manner described above.

In one embodiment, when the pollution monitoring management controller 302 issues an acknowledgment signal, the interface 312 converts the acknowledgment signal into a suitable signal formatted for communication over the legacy utility communication system 414. The suitably formatted acknowledgment signal is then communicated through the legacy utility communication system 414 and is transmitted to the site controller 404, via connections 306 and 110. The site controller 404 then converts the received acknowledgment signal from the legacy utility communication system 414 into a suitably formatted signal for transmission out to the selected transceiver(s) as described above.

The components (not shown) residing in the interface 312 and the site controller 404 that are configured to transmit, receive and convert signals from the legacy utility communication system 414 are known in the art and, therefore, are not described in detail herein other than to the extent necessary to understand the operation and functioning of these components when employed as part of the interface 312 and the site controller 404. Such known components are too numerous to describe in detail herein and that any configuration of such known components having the above-described functionality may be implemented in the interface 312 and the site controller 404 without departing substantially from the pollution information message system. Any such implementation of the components configured to receive and convert communication signals from the legacy utility communication system 414 are intended to be within the scope of this disclosure and to be protected by the accompanying claims.

Site controller 406 is communicating to interface 312 via a digital communication system 416, via connections 110 and 306. Thus, site controller 406 is configured to provide a suitable signal having pollution information that is provided to the digital communication system 416. The digital communication system 416 is a based communication system configured to communication information in a digital format. Non-limiting examples of such digitally based communications systems include digital subscriber loops (DSL), X.25, Internet protocol, (IP), Ethernet, Integrated services digital network (ISDN) and asynchronous transfer mode (ATM). Such digital communication systems may employ a PSTN, a frame relay based network and/or cable network. Furthermore, such digital communication systems may employ combinations of the above-described systems having a plurality of segments employing different technologies on each segment.

The digital communication system 416 receives the suitably configured pollution information from the site controller 406 and relays the information to the interface 312. Interface 312 converts the received pollution information from the digital communication system 416 and reformats the pollution information into a suitable communication signal that is provided to processor 308 (FIG. 3) such that the pollution information is stored in the data base 314 (FIG. 3) in a manner described above.

In one embodiment, when the pollution monitoring management controller 302 issues an acknowledgment signal, the interface 312 converts the acknowledgment signal into a suitable signal formatted for communication over the digital communication system 416. The suitably formatted acknowledgment signal is then communicated through the digital communication system 416 and is transmitted to the site controller 406, via connections 306 and 110. The site controller 406 then converts the received acknowledgment signal from the digital communication system 416 into a suitably formatted signal for transmission out to the selected transceiver(s) as described above.

The components (not shown) residing in the interface 312 and site controller 406 that are configured to received and convert signals from the digital communication system 416 are known in the art and, therefore, are not described in detail herein other than to the extent necessary to understand the operation and functioning of these components when employed as part of the interface 312 and the site controller 406. Such well known components are too numerous to describe in detail herein, and that any configuration of such known components having the above-described functionality may be implemented in the interface 312 and the site controller 406 without departing substantially from the pollution information message system. Any such implementation of the components configured to receive and convert communication signals from the digital communication system are intended to be within the scope of this disclosure and to be protected by the accompanying claims.

Site controller 408 is communicating to interface 312 via a radio frequency (RF) communication system having at least a first transceiver 418 configured to broadcast RF signals 420 to transceiver 422. An alternative embodiment employs other mediums of broadcast signals, such as, but not limited to, microwave. Thus, site controller 408 is configured to provide a suitable signal having pollution information that is provided to the transceiver 418. The transceiver 418 receives the suitably configured pollution information from the site controller 408 and relays the information to transceiver 422. The transceiver 422 relays the information to the interface 312. Interface 312 converts the received pollution information from the transceiver 422 and reformats the pollution information into a suitable communication signal that is provided to processor 308 (FIG. 3) such that the pollution information is stored in the data base 314 in a manner described above.

In one embodiment, when the pollution monitoring management controller 302 issues an acknowledgment signal, the interface 312 converts the acknowledgment signal into a suitable signal formatted for communication between transceivers 422 and 418. The suitably formatted acknowledgment signal is then communicated through the transceivers 422 and 418 and is transmitted to the site controller 408 via connections 306 and 110. The site controller 408 then converts the received acknowledgment signal from the transceivers 422 and 418 into a suitably formatted signal for transmission out to the selected transceiver(s) as described above.

The components (not shown) residing in the interface 312 and the site controller 408 that are configured to transmit, receive and convert signals from the transceivers 418 and 422 are known in the art and, therefore, are not described in detail herein other than to the extent necessary to understand the operation and functioning of these components when employed as part of the interface 312 and the site controller 408. Such known components are too numerous to describe in detail herein, and that any configuration of such known components having the above-described functionality may be implemented in the interface 312 and the site controller 408 without departing substantially from the pollution information message system. Any such implementation of the components configured to receive and convert communication signals from the transceivers 418 and 422 are intended to be within the scope of this disclosure and to be protected by the accompanying claims.

Site controller 410 is communicating to interface 312 via an Internet system 424, via connections 110 and 306. Thus, site controller 410 is configured to provide a suitable signal having pollution information that is provided to the Internet system 424. Internet system 424 receives the suitably configured pollution information from the site controller 410 and relays the information to the interface 312. Interface 312 converts the received pollution information from the Internet system 424 and reformats the pollution information into a suitable communication signal that is provided to processor 308 (FIG. 3) such that the pollution information is stored in the database 314 (FIG. 3) in a manner described above.

In one embodiment, when the pollution monitoring management controller 302 issues an acknowledgment signal, the interface 312 converts the acknowledgment signal into a suitable signal formatted for communication over the Internet system 424. The suitably formatted acknowledgment signal is then communicated through the Internet system 424 and is transmitted to the site controller 410 via connections 306 and 110. The site controller 410 then converts the received acknowledgment signal from the Internet system 424 into a suitably formatted signal for transmission out to the selected transceiver(s) as described above.

The components (not shown) residing in the interface 312 and the site controller 410 that are configured to transmit, receive and convert signals from the Internet system 424 are known in the art and, therefore, are not described in detail herein other than to the extent necessary to understand the operation and functioning of those components when employed as part of the interface 312 and the site controller 410. Such well known components are too numerous to describe in detail herein, and that any configuration of such known components having the above-described functionality may be implemented in the interface 312 and the site controller 410 without departing substantially from the pollution information message system. Any such implementation of components configured to receive and convert communication signals from the Internet system 424 are intended to be within the scope of this disclosure and to be protected by the accompanying claims.

Other embodiments of the site controllers and the interface 312 are configured to communicate with other communication networks or combination networks having a plurality of segments employing different communication technologies on each segment. For example, a site controller and a interface could be configured to communicate over satellite based communication systems. Another example includes a combination system that employs the PSTN 408 and the Internet system 412. Such a combination system would include an interface device to interface the PSTN 408 with the Internet system 412. There are no intended limitations with respect to the interfacing communication technology through which a site controller and an interface 312 (FIG. 3) communicate. Any such implementation of a site controller and an interface 312 configured to communicate through another communication technology in accordance with the operation and functionality of the pollution information message system described herein is intended to be within the scope of this disclosure and to be protected by the accompanying claims.

One embodiment of the site controller and/or interface 312 employs a plurality of standardized components, and is configured to receive an interface card. The interface card is configured to provide connectivity to the communication system that is used by the pollution information message system to communicate over. Such an embodiment is particularly suited to implementing a mass produced pollution information message system.

e. Operation of the Pollution Monitoring Management Controller

Figure 5:
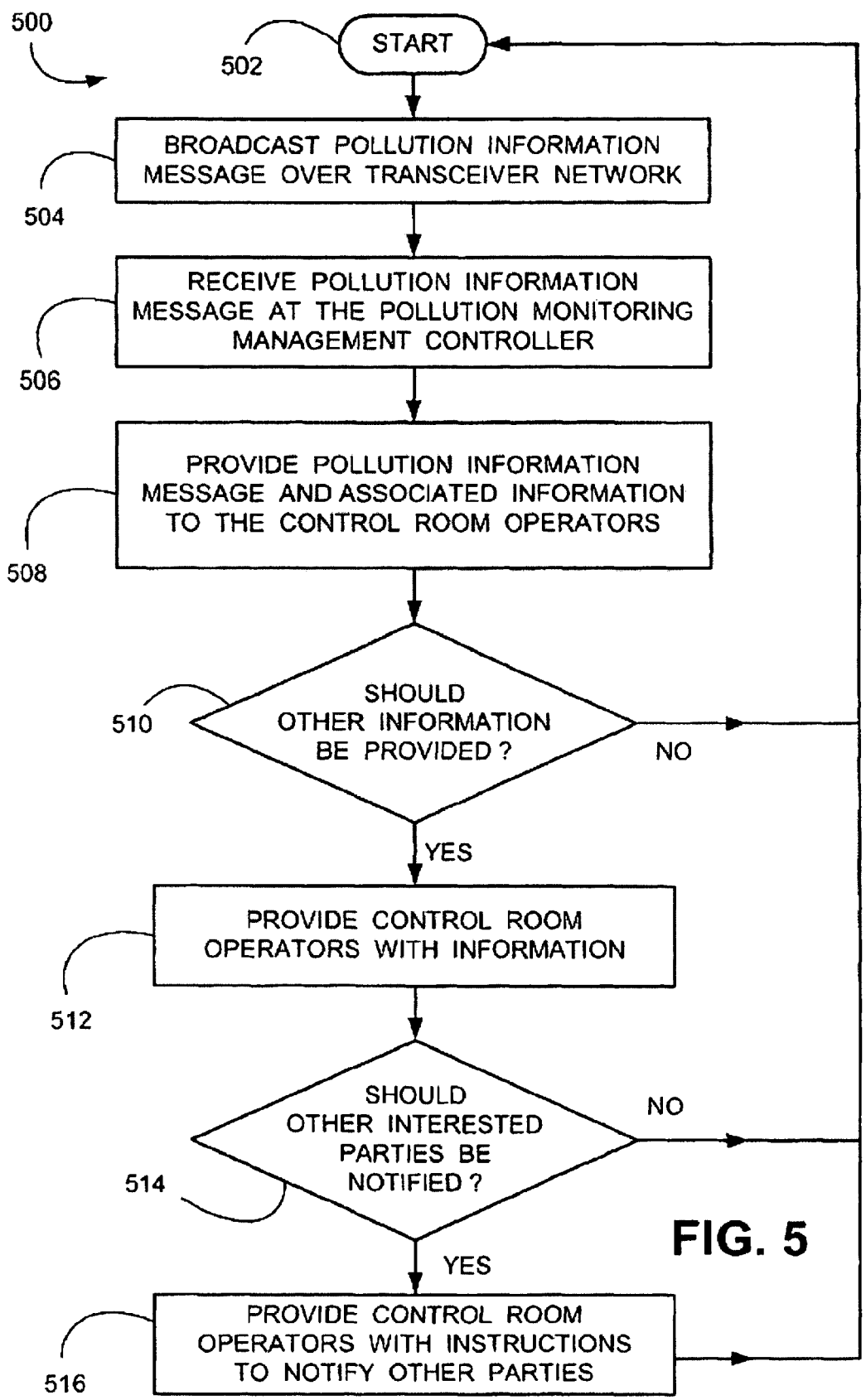
FIG. 5 is a flow chart illustrating a process for communicating a pollution information message generated by one of the transceivers of FIGS. 1-2.

FIG. 5 is a flow chart 500 illustrating a process for communicating a pollution information message generated by one of the transceivers of FIGS. 1-2. The flow chart 500 shows the architecture, functionality, and operation of a possible implementation of the software associated with the pollution message monitoring controller logic 316 (FIG. 3). In this regard, each block may represent a module, segment, or portion of code, which comprises one or more executable instructions for implementing the specified logical function(s). It should also be noted that in some alternative implementations, the functions noted in the blocks may occur out of the order noted in FIG. 5, or may include additional functions, without departing significantly from the functionality of the process of the pollution monitoring management controller. For example, two blocks shown in succession in FIG. 5 may in fact be executed substantially concurrently, the blocks may sometimes be executed in the reverse order, or some of the blocks may not be executed in all instances, depending upon the functionality involved, as will be further clarified herein below. All such modifications and variations are intended to be included herein within the scope of this disclosure and to be protected by the accompanying claims.

When the pollution message monitoring controller logic 316 is implemented as software and stored in memory 310 (FIG. 3), the pollution message monitoring controller logic 316 can be stored on any computer readable medium for use by or in connection with any computer and/or processor related system or method. In the context of this document, a memory 310 is a computer readable medium that is an electronic, magnetic, optical, or other another physical device or means that contains or stores a computer and/or processor program. The pollution message monitoring controller logic 316 can be embodied in any computer readable medium for use by or in connection with an instruction execution system, apparatus, or device, such as a computer-based system, processor-containing system, or other system that can fetch the instructions from the instruction execution system, apparatus, or device and execute the instructions associated with the pollution message monitoring controller logic 316. In the context of this specification, a "computer readable medium" can be any means that can store, communicate, propagate, or transport the program associated with the pollution message monitoring controller logic 316 for use by or in connection with the instruction execution system, apparatus, and/or device. The computer readable medium can be, for example, but not limited to, an electronic, magnetic, optical, electromagnetic, infrared, or semiconductor system, apparatus, device, or propagation medium. More specific examples (a nonexhaustive list) of the computer readable medium would include the following: an electrical connection having one or more wires, a portable computer diskette, a random access memory (RAM), a read-only memory (ROM), an erasable programmable read-only memory (EPROM, EEPROM, or Flash memory), an optical fiber, and a portable compact disc read-only memory (CDROM). Note that the computer-readable medium, could even be paper or another suitable medium upon which the program associated with the pollution message monitoring controller logic 316 is printed, as the program can be electronically captured, via for instance optical scanning of the paper or other medium, then compiled, interpreted or otherwise processed in a suitable manner if necessary, and then stored in memory 310 or in another suitable memory.

The process starts at block 502 when the presence of pollution is detected by a pollution detector, as described above.

At block 504, a transceiver is actuated in response to receiving a signal from the pollution detector such that a pollution information message is broadcasted over the transceiver network 100 (FIG. 1). At block 506, the pollution information message is received at the pollution monitoring management controller 302 (FIG. 3) in a manner described above. At block 508, the pollution monitoring management controller 302 executes the pollution message monitoring controller logic 316. Accordingly, in one embodiment, a suitably formatted pollution information message is provided to the control room operators 304 (FIG. 3).

At block 510, a determination is made whether or not other information should be provided. If no other information is provided at block 510 (the NO condition), the process returns to block 502. If other information should be provided to the control room operators 304 (the YES condition), the other information is provided to the control room operators 304 at block 512. As described above, such information may include, but is not limited to, the identification code of each the transceivers, the location of the transceiver, and the nature of the detected pollution.

At block 514, a determination is made whether or not other interested parties should be notified. If no other interested parties are to be notified at block 510 (the NO condition), the process returns to block 502. If other information should be provided to the control room operators 304 (the YES condition), the other information is provided to the control room operators 304 at block 516. For example, the pollution message monitoring controller logic 316 may determine that a company representative associated with a monitored facility, government regulatory authorities, or other individual(s) identified in the database 314 should be notified of the received>pollution information message. The process then returns to block 502 to await the next pollution event.

f. Transceiver Maintenance Feature

One embodiment described above employs transceivers configured to transmit pollution information messages back to the pollution monitoring management controller 302 (FIG. 3). Each transceiver includes its unique identification code as part of the broadcasted pollution information message. Location information for each transceiver, identified in database 314 (FIG. 3), is determined by associating the identification code in the received pollution information message with the corresponding location information (identified by the corresponding identification code). Transceivers transmitting information back to the pollution monitoring management controller 302, in one embodiment, are configured to include logic that indicates the operational status of the pollution detecting device and/or its associated components back to the pollution monitoring management controller 302. The pollution message monitoring controller logic 316 (FIG. 3) includes a transceiver maintenance function that evaluates received status and information from the signals transmitted by the transceivers such that the operational integrity of the pollution detector is accessed. That is, if a component in the pollution detector fails, the status information indicates failure of that component. The pollution message monitoring controller logic 316 provides the appropriate indication to the control room operators 304 such that maintenance personnel are dispatched out to the pollution detecting device and/or the transceiver to effect a repair of the nonfunctioning or improperly functioning component.

One embodiment employing the above-described maintenance feature employs transceivers configured to periodically transmit status information to the pollution monitoring management controller 302 at predefined time intervals. Another embodiment employs transceivers configured to respond to a status information request generated by the pollution monitoring management controller 302. Here, logic residing in the pollution message monitoring controller logic 316 would perform a maintenance function wherein pre-selected transceivers are requested to provide status information. Another embodiment employs transceivers configured to generate periodic status reports to the pollution monitoring management controller 302 and are configured to respond to requests for status information from the pollution monitoring management controller 302. In yet another embodiment, all three types of the above-described transceivers are employed to communicate status information to the pollution monitoring management controller 302.

When a transceiver component that broadcast the status information fails, such as, but not limited to, the transceiver itself, the failure is detected by a loss of signal. Thus, in an embodiment employing a transceiver that is to provide an acknowledgment signal, or provide a status signal in response to a status information request, or is to provide periodic status information reports, the failure of the transceiver to respond or provide information at scheduled times and/or in response to a status inquiry, indicates a component failure.

Summarizing, the above-described embodiment includes a maintenance functionality such that the operational status of the transceivers residing in the transceiver network 100 (FIG. 1) and/or pollution detectors are monitored to ensure continuous operational functionality. Other components of the above-described communication network, such as the detectors and/or their components, may be also monitored. Thus, a detected failure in a transceiver, transceiver component, detector and/or a detector component may be quickly detected such that maintenance personnel are dispatched to repair the failed transceiver, detector or components. This embodiment is particularly advantageous in providing a pollution information message system having a high degree of operational reliability and integrity.

g. Defining Transceiver Communication Paths

For convenience describing the operation and functionality of the transceiver network 100 (FIG. 1), a simplified description of the communication paths employed by the plurality of transceivers is described above. In one embodiment, all transceivers employed in the transceiver network have both the capability to receive broadcasted signals and to broadcast signals. However, many of the transceivers have a limited transmit signal range as the strength of the broadcasted signal is relatively low. This embodiment is particularly suited in transceiver network 100 configurations employing a large number of transceivers located in close proximity to other transceivers.

In one embodiment, the communication path that a transceiver employs for broadcasting signals is predefined. For example, transceiver 102a in FIG. 1 was described above as transmitting pollution information messages to transceiver unit 106 over the path defined by signals 118a, 122a and 122b. That is, when the transceiver unit 106 receives a pollution information message from transceiver 102a, transceiver stations 116a and 116b are configured to relay the signal to the transceiver unit 106. Here, if another transceiver station (not shown) detects the pollution information message from transceiver 102a, that transceiver station simply ignores the detected pollution information message and does not relay the pollution information message.

In one embodiment, transmission paths for all transceivers are predetermined by the pollution monitoring management controller 302 (FIG. 3). Path information is broadcasted out to all components of the transceiver network 100, transceiver stations, transceiver units and site controllers. This information is stored in a memory residing in or coupled to each of the components of the transceiver network 100, transceiver stations, transceiver units and site controllers. Each component then configures itself to react only to those signals for which it is part of the predefined path. Thus, when the transceiver unit 102b detects a pollution information message from transceiver 102a, transceiver units 102b recognizes that it is not part of the path to transceiver 102a, and simply takes no action.

In one embodiment, the communication paths are defined by using the identification codes associated with each transceiver, and identification codes assigned to the transceiver stations, transceiver units and site controllers. For example, if site controller 104 is defined by the identification code "104", transceiver unit 106 is defined by the identification code "106", transceiver station 116b is defined by the identification code "116b", transceiver station 116a is defined by the identification code "116a", and transceiver 102a is defined by the identification code "102a", the path between the site controller 104 and transceiver 102a is simply defined by a code such as 104.106.116b.116a.102a (where each number corresponds to the component identification code). Other suitable codes are easily defined.

Such a system is described in detail in the commonly assigned patent entitled "MULTI-FUNCTION GENERAL PURPOSE TRANSCEIVER," filed Mar. 18, 1999, and accorded U.S. Pat. No. 6,233,327B1, issued on May 15, 2001 and incorporated herein by reference in its entirety.

In one embodiment of the pollution information message system, failure of a transceiver or a transceiver component is detected in a manner described above. When such a failure is detected, communications with other transceivers may be disrupted if the failed transceiver or transceiver component is in the communication path of other transceivers. In such a situation, upon the detection of the failed transceiver or transceiver component, the pollution monitoring management controller 302 (FIG. 3) redefines communication paths for affected transceivers, and transmits the redefined paths out to the transceivers, transceiver stations, transceiver units and site controllers such that the paths are redefined. For example, transceiver station 116a (FIG. 1) may fail. Thus, transceivers 102a, 102b and 102c (FIG. 1) will not be in communication with the pollution monitoring management controller 302 (FIG. 3). The communication path for transceiver 102c would then be redefined such that transceiver 102c is communicating with transceiver 102d (assuming that transceiver 102d is sufficiently close to transceiver 102c to detect signals broadcasted from transceiver 102c). Thus, transceiver 102c would be in communication with the transceiver unit 106 (FIG. 1) through a newly defined path indicated by the signals 128a, 118d and 122b (FIG. 1). Here, transceiver 102d is operating as both a transceiver (when communicating information from the pollution detector 114d) and a network transceiver (when communicating information from other transceivers).

Similarly, the communication path for transceiver 102b would then be redefined such that transceiver 102b is communicating with transceiver 102c (assuming that transceiver 102c is sufficiently close to transceiver 102b to detect signals broadcasted from transceiver 102b). Thus, transceiver 102b would be in communication with the transceiver unit 106 through a newly defined path indicated by the signals 128b, 128a, 1118d and 122b (FIG. 1). Here, transceivers 102c and 102d are operating as both a transceiver (when communicating information from the pollution detectors 114c and 114d, respectively) and a network transceiver (when communicating information from other transceivers).

Similarly, the communication path for transceiver 102a would then be redefined such that transceiver 102a is communicating with transceiver 102b (assuming that transceiver 102b is sufficiently close to transceiver 102a to detect signals broadcasted from transceiver 102a). Thus, transceiver 102a would be in communication with the transceiver unit 106 through a newly defined path indicated by the signals 128c, 128b, 128a, 118d and 122b (FIG. 1). Here, transceivers 102b, 102c and 102d are operating as both a transceiver (when communicating information from the pollution detectors 114b, 114c and 114d, respectively) and a network transceiver (when communicating information from other transceivers).

One skilled in the art will appreciate that the possible communication paths in a transceiver network 100 are nearly limitless, and that such communication paths are easily redefined by the pollution monitoring management controller 302. The above described examples are intended to illustrate some of the alternative redefined communication paths to explain the operation and functionality of the maintenance feature of one embodiment of the pollution information message system.

h. Alternative Embodiments of the Pollution Information Message System

For convenience of describing the operation and functionality of the pollution monitoring management controller 302 (FIG. 3), an integral part of the pollution information message system, the pollution monitoring management controller 302 was illustrated as a stand-alone unit. The pollution monitoring management controller 302, in an alternative embodiment, is implemented as an integral component of another system, such as, but not limited to, a facility monitoring system, without departing substantially from the operation and functionality of the pollution information message system.

Furthermore, the components illustrated as residing in the pollution monitoring management controller 302 may reside in alternative convenient locations outside of the pollution monitoring management controller 302 without adversely affecting the operation and functionality of the pollution information message system. Such components may even be integrated with other existing components residing in the pollution monitoring control center, thereby minimizing the cost of implementing a pollution information message system.

For example, the database 314 residing in the memory 310 (FIG. 3) may be implemented in a memory unit residing in an alternative location, such as the control console 322. Thus, information provided used the pollution information message system could simply be transferred to a database residing in the alternative location.

Similarly, the pollution message monitoring controller logic 316 (FIG. 3) could reside in a convenient alternative location and be executed by a different processor that resides in a convenient alternative location. Also, the interface 312 may be implemented as a stand-alone interface unit residing in a convenient location. For example, interface 312 may be implemented as a stand-alone PC, a network PC, a dedicated intra-network interface or the like that performs the functionality of receiving information through a communication network from the site controller 104 (FIGS. 1 and 2).

For convenience of describing the operation and functionality of the pollution monitoring management controller 302 (FIG. 3), the pollution monitoring management controller 302 is illustrated as a stand-alone unit residing within the pollution monitoring control center 300. Another embodiment of the pollution monitoring management controller resides in an alternative convenient location outside of the pollution monitoring control center 300. In such an embodiment, connection 324 may be a connection of suitable length to provide connectivity between processor 308 and the control console 322. In other embodiments, connection 324 may include a plurality of components that provides connectivity over a special purpose network or an existing, general purpose network. For example the pollution monitoring management controller 302 could be in communication with the pollution information message system over any one of the communication systems described above and illustrated in FIG. 4. Such a configuration is easily implemented using appropriate interface components. Such interface components residing in a pollution monitoring management controller that are configured to transmit, receive and convert signals are known in the art and, therefore, are not described in detail herein other than to the extent necessary to understand the operation and functioning of these components when employed as part of the pollution information message system that is remote from the pollution monitoring control center 300. One skilled in the art will realize that such known components are too numerous to describe in detail herein, and that any configuration of such known components having the above-described functionality may be implemented without departing substantially from the pollution information message system.

One embodiment of the pollution information message system is configured to couple a plurality of transceivers to a plurality of mobile air pollution detectors. A detector is used to monitor each one of a fleet of vehicles such that total pollution of the entire fleet is monitored or pollution from an individual unit of the fleet is monitored. Another embodiment is configured to monitor individual vehicles and/or various components of the vehicle to detect pollution. Such an embodiment is desirable in applications where, for example, but not limited to, exhaust emission and fluid leakages are monitored on the vehicle.

Another embodiment employs a power line carrier (PLC) signal to communicate signals from pollution detectors such that a receiving transceiver generates a pollution information message. For example, but not limited to, detector unit 220 (FIG. 2), in one embodiment, is supplied power via wire 226 which is coupled to the electric distribution network 228. Rather than being coupled to the transceiver 202, the detector unit 220 is configured to generate a suitable PLC signal and to communicate pollution information to the transceiver 230 using PLC signals.

Transceiver 230 is coupled to the electric distribution network 228 at a suitable location. For convenience of illustration, transceiver 230 is illustrated as being coupled to an electrical outlet 232. Electrical outlet 232 is coupled to the electric distribution network 228 via wire 234. One embodiment employs a standard outlet spade-type connector (not shown) to couple the transceiver 230 to the electrical outlet 232. Another embodiment of the transceiver 230 is coupled to the outlet 232 with wire connections coupled at suitable connection points. Another embodiment of the transceiver 230 is coupled to another suitable location on the electric distribution network 234 such that the transceiver 230 is able to reliably receive signals from the detector unit 220.

Thus, when the detector unit 220 detects pollution, a PLC signal is communicated from the detector unit 220 to the transceiver 230 over the electric distribution network 228. Upon receiving a PLC signal having pollution information, the transceiver 226 generates and communicates a pollution information signal 236 in any one of the previously described manners. The communication of PLC signals, and the equipment that generates PLC signals, is known in the art, and is therefore not described in further detail other than to the extent necessary to understand the communication of PLC signals to a transceiver employed as part of a pollution monitoring management system.

Other detectors coupled to the electric distribution network may also be configured to generate PLC signals that are communicated to transceiver 226. Such an embodiment of pollution detection system employing detector units communicating to transceiver 230 with PLC signals is particularly advantageous when it is desirable to employ a pollution detection system within a facility having a distribution network 228 that can be conveniently accessed.

The embodiment of the pollution information message system was described herein to include a plurality of transceiver units configured to communicate based upon a predefined communication path specified by the pollution monitoring management controller 302. An alternative embodiment is configured to communicate with other special purpose systems that employ compatible transceivers. For example, a system for monitoring emergency, alarm, climate, or other conditions in a defined territory is disclosed in the co-pending commonly assigned non-provisional application entitled "SYSTEM FOR MONITORING CONDITIONS IN A RESIDENTIAL LIVING COMMUNITY," filed Mar. 18, 1999, and accorded Ser. No. 09/271,517, incorporated herein by reference in its entirety. Another system for controlling electricity demand in a defined territory is disclosed in the co-pending commonly assigned non-provisional application entitled "SYSTEM AND METHOD FOR CONTROLLING POWER DEMAND OVER AN INTEGRATED WIRELESS NETWORK," filed Aug. 15, 2001, and accorded Ser. No. 09/929,926, incorporated herein by reference in its entirety. The above applications describe a computerized system for monitoring power and/or other conditions in a defined territory using a network of transceivers communicating back to a remote facility via a plurality of repeaters and a central system (such as a site controller). The plurality of transceivers configured for monitoring power and/or other conditions in a defined territory are integrated with a plurality of transceivers for controlling customer premises appliances, thereby reducing overall facility, maintenance and installation costs by employing common units. For example, a transceiver controlling an air conditioning unit or a transceiver monitoring pollution (in accordance with the application Ser. No. 09/929, 926) may be integrated to communicate through same transceiver stations, transceiver units and/or site controllers communication pollution information messages. The integrated system would simply recognize the transceiver communicating a pollution information message and appropriately route communications to and/or from that transceiver to the appropriate remote facility. One skilled in the art will appreciate that a pollution information message system described herein is interpretable into any other special purpose system or a multipurpose system based upon a network of similarly configured transceivers that communicate through common components.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

The invention claimed is:

1. A system which communicates a pollution information message, the system comprising:

a pollution detector, the pollution detector comprising an interface unit coupled to a detector unit, the interface unit receiving pollution information from the detector unit, the pollution detector configured to generate a pollution information signal if a pollution level exceeding a predetermined threshold is detected;

a first transceiver having a unique identification code indicating a location of the first transceiver, the first transceiver configured to receive the pollution information signal from the pollution detector and generate a pollution information message, the pollution information message including the unique identification code of the first transceiver, pollution detector type, detected pollution levels, and pollution detector operational status, the first transceiver configured to transmit the pollution information message to a second transceiver, wherein the second transceiver is one of a plurality transceivers in a transceiver network;

the second transceiver configured to receive the pollution information message and retransmit the pollution information message to a site controller;

wherein the site controller is located between the second transceiver and a management controller, the site controller configured to receive the pollution information message from the second transceiver and convert the pollution information message into a suitable format for communicating to the management controller;

wherein the management controller configured to receive the pollution information message from the site controller and store the received pollution information message in a memory, the memory further including the unique identification code and the associated location of the first transceiver, identification code associated with each of the plurality of transceivers in the transceiver network and information identifying a specific destination where a pollution alert will be sent based upon the detected pollution levels in the received pollution information message; and a processor coupled to the memory and configured to provide an appropriate indication of the operational status of the pollution detector in the received pollution information message to an operator, the processor configured to calculate one or more predetermined transmission paths for the plurality of transceivers and broadcast out the predetermined transmission paths to the plurality of transceivers, wherein the predetermined transmission paths are calculated using the identification code associated with each of the plurality of transceivers, the processor further configured to determine status of the plurality of transceivers by polling status information from the plurality of transceivers and redefine the communication path for one or more of the plurality of transceivers upon a malfunction indicated in the status information of one or more of the plurality of transceivers.

2. The system of claim 1, wherein the site controller intermediary further comprises a portion of an Internet.

3. The system of claim 1, wherein the site controller further comprises a portion of a digital communication system.

4. The system of claim 1, wherein the site controller further comprises a portion of a public switched telephone network.

5. The system of claim 1, wherein the site controller further comprises a combination of portions of at least an Internet, a digital communication system and a public switched telephone network.

6. The system of claim 1, wherein the site controller further comprises a combination of portions of at least an Internet and a public switched telephone network.

7. The system of claim 1, wherein the site controller further comprises a combination of portions of at least an Internet, a digital communication system.

8. The system of claim 1, wherein the site controller further comprises a combination of portions of at least a digital communication system and a public switched telephone network.

9. A method for communicating pollution information messages, the method comprising:

generating a pollution information signal by a pollution detector if a pollution level exceed a predetermine threshold;

sending the pollution information signal to a first transceiver;

generating a pollution information message with the first transceiver in response to receiving the pollution information signal from the pollution detector, the pollution information message having at least an identification code uniquely assigned to the first transceiver, pollution detector type, detected pollution levels, and pollution detector operational status;

communicating the pollution information message from the first transceiver to a second transceiver, wherein the second transceiver is one of a plurality of transceivers in a transceiver network;

receiving by the second transceiver the pollution information message and retransmit by the second transceiver to a site controller;

receiving the pollution information message from the second transceiver by the site controller, wherein the site controller is located between the second transceiver and a management controller;

converting by the site controller the received pollution information message into a suitable format for communicating to the management controller;

receiving the pollution information message by the management controller from the site controller and store the received pollution information message in a memory of the management controller, the memory further including the unique identification code and the associated location of the first transceiver, identification code associated with each of the plurality of transceivers in the transceiver network and information identifying a specific destination where a pollution alert will be sent based upon the detected pollution levels in the received pollution information message; and providing by a processor coupled to the memory, an appropriate indication of the operational status of the pollution detector in the received pollution information message to an operator;

calculating by the processor, one or more predetermined transmission paths for the plurality of transceivers and broadcast out the predetermined transmission paths to the plurality of transceivers, wherein the predetermined transmission paths are calculated using the identification code associated with each of the plurality of transceivers stored in the memory;

determining by the processor, status of the plurality of transceivers by polling status information from the plurality of transceivers and redefine the communication path for one or more of the plurality of transceivers upon a malfunction indicated in the status information of one or more of the plurality of transceivers.

10. The method of claim 9, wherein the converting further comprises converting the pollution information message into a suitable Internet signal, and wherein the site controller is a portion of an Internet.

11. The method of claim 9, wherein the converting further comprises converting the pollution information message into a suitable digital signal, and wherein the site controller is a portion of a digital communication system.

12. The method of claim 9, wherein the converting further comprises converting the pollution information message into a suitable telephone signal, and wherein the site controller is a portion of a public switched telephone network.

13. The method of claim 9, wherein the converting further comprises converting the pollution information message into a suitable Internet signal, and wherein the site controller is a portion of at least an Internet, a digital communication system and a public switched telephone network.

14. The method of claim 9, further comprising receiving the signal from a mobile detector configured to detect pollution such that generating the pollution information message and such that a location of the mobile detector is approximated by location information associated with the identification code of the first transceiver.

* * * * *